June 15, 1937.    C. T. WALTER    2,083,970
PIPE JOINT
Filed Jan. 6, 1936    2 Sheets-Sheet 1

Charles T. Walter
INVENTOR
BY
ATTORNEY

June 15, 1937.  C. T. WALTER  2,083,970
PIPE JOINT
Filed Jan. 6, 1936  2 Sheets-Sheet 2

Charles T. Walter
INVENTOR

BY
ATTORNEY

WITNESS-

Patented June 15, 1937

2,083,970

UNITED STATES PATENT OFFICE 2,083,970

PIPE JOINT

Charles T. Walter, Chicago, Ill., assignor to Industrial Patents Corporation, Chicago, Ill., a corporation of Delaware Application January 6, 1936, Serial No. 57,687

11 Claims. (Cl. 285—9)

This invention relates to an improved pipe joint.

One of the objects of this invention is to provide an improved pivotal pipe joint of the uni-directional type which will operate at maximum efficiency under heavy pressures.

Another object of this invention is to provide a pivotal pipe joint of the uni-directional type which will operate with a minimum of friction under heavy pressures.

Another object of this invention is to provide an improved pipe joint of the uni-directional type pivotal on a central spindle utilizing an anti-friction bearing.

Other objects will be apparent from the description and claims which follow.

In the accompanying drawings, similar reference characters in the several figures designate similar parts.

Figure 1:
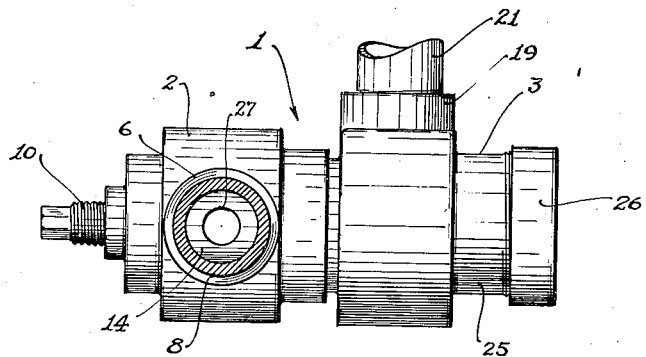
Figure 1 is a side elevational view illustrating one embodiment of my invention. In this view the inlet and outlet means are shown pivoted substantially 90°.
Figure 2:
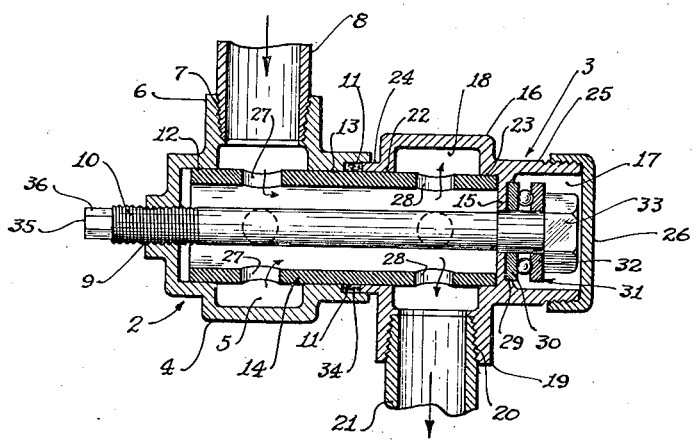
Figure 2 is a transverse view, partly in section, of the pipe joint illustrated in Figure 1. In this view, the inlet and outlet means are shown pivoted substantially 180°.
Figure 3:
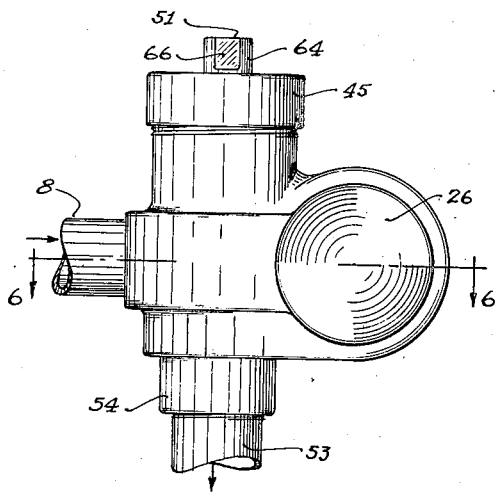
Figure 3 is an end view illustrating another embodiment of the pipe joint shown in Figure 1.
Figure 4:
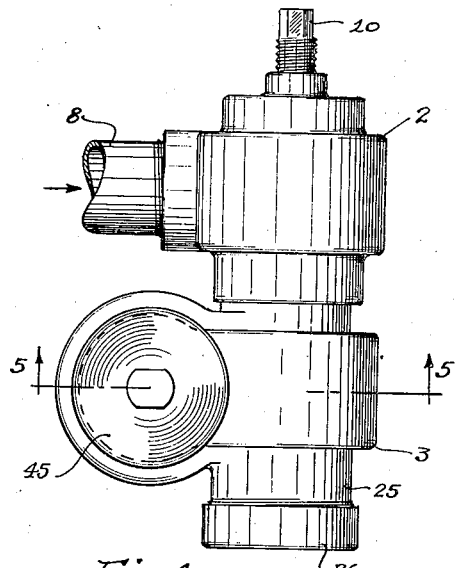
Figure 4 is a top view of the pipe joint as shown in Figure 3.

Referring now to the embodiment of my invention illustrated in Figures 1 and 2 of the drawings.

The pipe joint, broadly indicated by the numeral 1, comprises a stationary casing 2 and oscillating casing 3. Casing 2 is radially enlarged at 4 to provide channelway 5, from which laterally extends circular boss 6 interiorly threaded at 7 for the reception of inlet line 8. Casing 2, at one end, is provided with threaded opening 9 for the reception of adjustment bolt 10 and at its opposite end is recessed to provide packing chamber 11. The inner walls 12 and 13 of casing 2 are machined for the reception of tubular bushing 14 of suitable material having a pressed fit therein.

Casing 3 is divided by wall 15 to form material chamber 18 and bearing chamber 17. Casing 3, like casing 2, is radially enlarged at 16 to form said channelway 18, from which extends lateral boss 19 having an interiorly threaded opening 20 for the reception of outlet line 21. The inner walls 22 and 23 of casing 3 are machined to provide bearing surfaces in slidable engagement with bushing 14. Casing 3, at one end, is provided with machined peripheral flange 24 having a sliding fit within recess 11 of casing 2 and at the opposite end with exteriorly threaded flange 25, upon which is secured cap 26.

Bushing 14 is provided with a plurality of lateral ports 27 and 28 communicating with channelways 5 and 18, respectively.

Wall 15 is recessed at 29, in which is pressed fixed race 30 of bearing member 31, which bearing member is preferably of the ball bearing anti-frictional type. Race 32 of bearing 31 is held in position by head 33 of bolt 10.

In assembling the pipe joint illustrated in Figures 1 and 2 of the drawings, bushing 14 is pressed within casing 2 and packing rings 34 inserted within packing chamber 11 around bushing 14. Casing 3 is then placed upon bushing 14 with flange member 24 directed within packing chamber 11. Bolt 10 is passed through suitable openings in bearing 31 and wall 15 and threaded within opening 9 of casing 2. Bolt 10 serves as a pivotal member between casings 2 and 3 and also provides means for wedging flange 24 against packing rings 34 to prevent leakage of material at the pivotal connection between the several casings. Cap 26 secured on threaded flange 25 serves to seal bearing chamber 17 against dirt and grit as well as means for packing grease or other lubricant around bearing member 31. End 35 of bolt 10 is provided with flats 36 as a wrench gripping means by which bolt 10 may be exteriorly adjusted from time to time to compensate for wear of packing rings 34.

In use, plastic, semi-liquid or liquid materials may be forced under heavy pressures through line 8 into channelway 5 of casing 2. Material entering channelway 5 will pass through ports 27 and follow the interior of bushing 14 to ports 28 whence it will pass through ports 28 into channelway 18 of casing 3 and through outlet line 21. At the free end of line 21, an extrusion nozzle or other forming or spraying means may be provided.

By reason of the bearing surfaces of the machined faces 22 and 23 of casing 3 against bushing 14 and bearing member 31 in engagement with bolt 10, casing 3 will oscillate on casing 2 with a minimum of friction regardless of the volume of pressure used for forcing the material therethrough.

The embodiment of my invention exemplified in Figures 3 to 6 of the drawings illustrates a pipe joint of the uni-directional type having universal movement, in which like numerals are used to designate similar parts common to the embodiment illustrated in Figures 1 and 2. In the joint shown in Figures 3 to 6, column 37 extends substantially at right angle to casing 2 and is radially enlarged at 38 to provide channelway 39 communicating with channelway 18 through opening 40.

Figure 5:
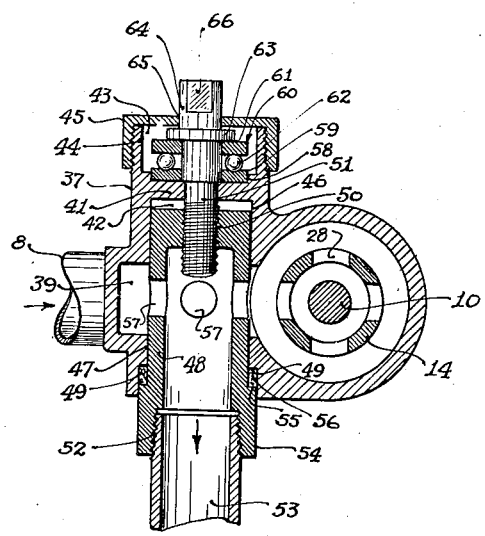
Figure 5 is a transverse view, partly in section, of Figure 3. This figure may also be considered as a view taken on line 5—5 of Figure 4.
Figure 6:
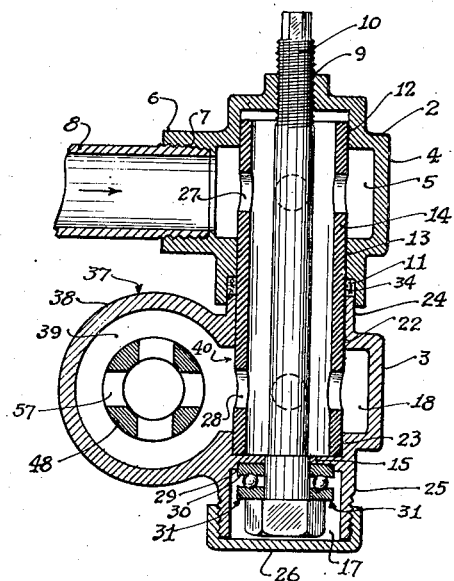
Figure 6 is a transverse view, partly in section, of Figure 4. This figure may also be considered as a view on line 6—6 of Figure 3.

Referring now more particularly to Figure 5, column 37, similar to casing 3, is divided by wall 41 to form chamber 42 and bearing chamber 43, the bearing chamber 43 being defined by flange member 44, exteriorly threaded at its outer end for the reception of cap 45.

Chamber 42 is centrally bored and machined at its inner faces 46 and 47 for the reception of bushing 48 rotatably fitted therein. Chamber 42 is recessed at its open end to define packing chamber 49.

The end of bushing 48 inserted within chamber 42 is sealed except for threaded opening 50 for the reception of pivotal bearing bolt 51. The opposite end of bushing 48 is open and is interiorly threaded at 52, from which extends outlet line 53. At its open end, bushing 48 is exteriorly enlarged at 54 to slidably fit within packing chamber 49.

Shoulder 55 of enlargement 54 serves to wedge packing rings 56 within packing chamber 49 as the bushing 48 is drawn within column 37 by bolt 51. A plurality of lateral ports 57 are provided in bushing 48 adjacent channelway 39 to admit product from channelway 39 to the interior of bushing 48 whence it is passed through outlet line 53. Wall 41 of bearing chamber 43 is recessed at 58, in which is pressed stationary race 59 of bearing member 60. Bearing member 60 is preferably of the anti-frictional ball bearing type comprising open race members 59 and 61 for carrying a plurality of ball bearings 62. Race 61 is held in position by enlargement 63 of bearing bolt 51.

Cap 45 is secured on threaded flange 44 and serves to seal bearing chamber 43 against dirt and grit, as well as a means for packing grease or other lubricant around bearing member 60. Cylindrical portion 64 of bolt 10 is closely fitted in opening 65 of cap 45 by which bearing chamber 43 is substantially sealed at that point without loss of movement to bolt 10.

Bearing bolt 51 at its outer end is provided with flats 66, which serve as an exterior wrench gripping means for taking up on bushing 48 from time to time to compensate the wear of packing rings 56 in packing chamber 49.

In practice, outlet line 53 may be equipped at its free end with an extrusion nozzle or other plastic forming means.

In assembling the joint illustrated in Figures 3 to 6 of the drawings, bushing 14 is pressed within casing 2 and packing rings 34 inserted within packing chamber 11 around bushing 14. Casing 3 is placed upon bushing 14 with flange member 24 directed within packing chamber 11. Bolt 10 is passed through suitable openings in bearing 31 and wall 15 and threaded within opening 9 of casing 2. Bolt 10 serves as a pivotal member between casings 2 and 3 and also provides means for wedging flange 24 against packing rings 34 to prevent leakage of material at the pivotal connection between the several casings. Bearing chamber 17 is sealed by means of cap 26.

Packing rings 56 are placed on bushing 48 from the small end and the bushing 48 inserted within column 37. Bearing member 60 is next secured within bearing chamber 43 and bolt 51 passed therethrough and threaded within opening 50 of bushing 48. Bushing 48 is drawn by bolt 51 within column 37 to sufficiently wedge packing rings 56 in packing chamber 49 and prevent leakage of material therearound.

In operation, plastic, semi-liquid material under pressure from line 8 will enter channelway 5 to pass through ports 27 to the interior of bushing 14 and through ports 28 into channelway 18. From channelway 18, the material is directed through opening 40 into channelway 39, thence through ports 57 to the interior of bushing 48 and through outlet line 53.

It will be seen that by reason of the pivotal movement of casing 3 in relation to casing 2 and of bushing 48 in relation to column 37, outlet line 53 is capable of movement in either direction in relation to inlet line 8.

It will be seen that by reason of the bearing surfaces of machined faces 22 and 23, and 46 and 47, and that due to the use of anti-friction bearing members 31 and 60, casing 3 will oscillate with respect to casing 2 and likewise bushing 48 with respect to column 37 with a minimum of friction regardless of the pressure used.

My improved pipe joint is especially adapted for use with heavy hydraulic pressure. It will be understood, however, that such use is merely by way of illustration and not by way of limitation, since the invention may be used to an equal advantage whether the material be passed therethrough by gravity or forced by compressed air or steam.

I claim:

1. A pipe joint of the class described comprising a casing having an inlet, a second casing pivotal on said first mentioned casing having an outlet, a bushing extending from one casing to the other and having a press fit within one of said casings and a slidable fit within the other of said casings, said bushing providing bearing surfaces for the movement of said pivotal casing and a pivotal bolt member for securing said pivotal casing on said bushing.

2. In a pipe joint of the class described, a casing having a radial enlargement to provide a channelway therein, a lateral inlet to said channelway, a second casing pivotal on said first mentioned casing having a radial enlargement to provide a channelway therein, a lateral outlet from said last mentioned channelway, a tubular bushing extending from one casing to the other and having a press fit within one of said casings and a slidable fit within the other of said casings, said bushing providing bearing surfaces for the movement of the pivotal casing and a conduit between said channelways, lateral ports in said bushing adjacent each of said channelways and a pivotal bolt member passing between said casings for securing the pivotal casing on said bushing.

3. In a pipe joint of the class described including a casing having a radial enlargement to provide a channelway therein, a lateral inlet to said channelway, a second casing pivotal on said first mentioned casing having a radial enlargement to provide a channelway therein, a tubular bushing passing between said casings having bearing surfaces for the pivotal movement thereof and providing a conduit between said channelways, lateral ports in said bushing communicating with each of said channelways, pivotal means for securing said casings on said bushing, a column extending from said second casing in angular relationship therewith, a radial enlargement providing a channelway within said column, a passageway between the channelways of said column and said second casing, a bushing having a closed end and an open end serving as an outlet pivotally secured within said column, lateral ports in said last mentioned bushing communicating with the channelway of said column and a pivotal member between said column and the closed end of said last mentioned bushing.

4. A pivotal pipe joint comprising a casing having an inlet, a second casing having an outlet and adapted for pivotal movement relative to said first mentioned casing, a tubular bushing having a press fit in one of said casings and a slidable fit in the other of said casings and providing bearing surfaces for the pivotal movement thereof and a conduit between said inlet and said outlet, ports in said bushing adjacent said inlet and said outlet, a pivot member connecting the several casings and an anti-friction bearing member between said pivot member and one of said casings.

5. A pivotal pipe joint comprising a fixed column having a lateral inlet and an open end annularly recessed to provide a packing chamber, packing in said chamber, a tubular bushing pivotally mounted within the open end of said column and provided with lateral ports adjacent said inlet and an annular enlargement registrable with said chamber and an adjustable pivot member for pivotally securing said bushing in said column with said annular enlargement in wedging relationship with the packing in said chamber.

6. In a pivotal pipe joint including a casing having an inlet, a second casing adjacent and pivotal on said first mentioned casing and means for pivotally securing said casings, a fixed column angularly extending from said second casing and open at one end, a passageway between said second casing and said column, a tubular bushing pivotally mounted within the open end of said column and provided with ports adjacent said passageway, a packing chamber between said column and said bushing and an adjustable pivot member for pivotally securing said bushing in said column in wedging relationship with said packing in said chamber.

7. In a pivotal pipe joint including a casing having an inlet, a second casing adjacent and pivotal on said first mentioned casing and means for pivotally securing said casings, a fixed column angularly extending from said second casing and open at one end, a passageway between said second casing and said column, an annular recess in the open end of said column providing a packing chamber, packing in said chamber, a tubular bushing pivotally mounted through the open end of said column and provided with lateral ports adjacent said passageway and an annular enlargement registrable with said chamber and an adjustable pivot member for pivotally securing said bushing in said column with said annular enlargement in wedging relationship with the packing in said chamber.

8. A pivotal pipe joint of the class described comprising a casing having an inlet and a second casing pivotally mounted on the first casing and having an outlet, a tubular bushing extending through both of the casings and providing bearing surfaces for the pivotal movement of the casings thereon and a conduit between the inlet and the outlet, ports in the bushing adjacent the inlet and outlet for the passage of material therebetween and means for securing together the casings and bushing.

9. A pivotal pipe joint of the class described comprising a casing having an inlet and a second casing pivotally mounted on the first casing and having an outlet, a tubular bushing extending through both of the casings and providing bearing surfaces for the pivotal movement of the casings thereon and a conduit between the inlet and the outlet, ports in the bushing adjacent the inlet and outlet for the passage of material therebetween and means including a pivotal bolt member and an antifriction bearing for securing together the casings and bushing.

10. A pivotal pipe joint of the class described comprising a casing having an annular enlargement providing a channelway and an inlet therein, a second casing pivotally mounted on the first casing and having an annuar enlargement providing a channelway and an outlet therein, a tubular bushing extending through both of the casings and providing bearing surfaces for the pivotal movement of the casings thereon and a conduit between the channelways, ports in the bushing adjacent the channelways for the passage of material therebetween and means for securing together the casings and bushing.

11. A pivotal pipe joint of the class described comprising a casing having a lateral outlet and an open end annularly recessed to provide a packing chamber, packing in said chamber, a second casing having a lateral outlet and an open end pivotally mounted reative to the open end of the first casing, the open end of the second casing being annularly flanged for registry with the chamber of the first mentioned casing, a tubular bushing extending through both of the casings and providing bearing surfaces for the pivotal movement thereof and an outlet between the inlet and the outlet, ports in the bushing adjacent the inlet and outlet for the passage of material therebetween and means for securing together the casings and bushing with the flange of the second casing in wedging relation with the packing in the recess of the first casing.

CHARLES T. WALTER.